United States Patent
Porter et al.

(10) Patent No.: US 9,684,914 B1
(45) Date of Patent: Jun. 20, 2017

(54) TECHNIQUES FOR REAL-TIME DYNAMIC PRICING

(71) Applicant: Amazon Technologies, Inc., Reno, NV (US)

(72) Inventors: Brandon William Porter, Yarrow Point, WA (US); Martin Robert Frank, Bainbridge Island, WA (US); Simon Kurt Johnston, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 616 days.

(21) Appl. No.: 14/158,737

(22) Filed: Jan. 17, 2014

(51) Int. Cl.
G06Q 30/02 (2012.01)
G06Q 30/06 (2012.01)

(52) U.S. Cl.
CPC ..... G06Q 30/0611 (2013.01); G06Q 30/0206 (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | | |
|---|---|---|---|
| 7,698,171 B2 | 4/2010 | Rampell et al. | |
| 8,583,513 B1 | 11/2013 | Talreja et al. | |
| 2002/0055933 A1 | 5/2002 | Feathers et al. | |
| 2005/0065853 A1* | 3/2005 | Ferreira | G06Q 30/0611 |
| | | | 705/26.3 |
| 2006/0173773 A1 | 8/2006 | Ettinger et al. | |
| 2007/0073593 A1* | 3/2007 | Perry | G06Q 30/02 |
| | | | 705/26.64 |
| 2008/0077506 A1 | 3/2008 | Rampell et al. | |
| 2008/0091528 A1 | 4/2008 | Rampell et al. | |
| 2008/0137837 A1* | 6/2008 | Patel | H04L 9/0637 |
| | | | 380/28 |
| 2008/0162269 A1 | 7/2008 | Gilbert | |
| 2008/0270209 A1 | 10/2008 | Mauseth et al. | |
| 2009/0106100 A1 | 4/2009 | Mashinsky | |
| 2009/0182677 A1 | 7/2009 | Otto et al. | |
| 2009/0234710 A1 | 9/2009 | Belgaied Hassine et al. | |
| 2009/0292599 A1 | 11/2009 | Rampell et al. | |
| 2010/0063898 A1* | 3/2010 | Obrecht | G06Q 30/02 |
| | | | 705/26.1 |

FOREIGN PATENT DOCUMENTS

WO 2008014226 1/2008

OTHER PUBLICATIONS

U.S. Appl. No. 60/820,701, filed Jul. 28, 2006, Titled: Alternative Payment Platform.

(Continued)

*Primary Examiner* — Ethan D Civan
*Assistant Examiner* — Ming Shui
(74) *Attorney, Agent, or Firm* — Kilpatrick Townsend & Stockton LLP

(57) ABSTRACT

A request to view an item may be received in an electronic marketplace. The request may cause an offer request to be sent to one or more merchants. The merchants may respond with corresponding offers. Upon receipt of the offer, so long as the offered is received during a time when offers are being accepted, a price may be determined for the item based at least in part on the received offers.

23 Claims, 10 Drawing Sheets

(56) References Cited

OTHER PUBLICATIONS

U.S. Appl. No. 60/825,885, filed Sep. 15, 2006, Titled: Alternative Payment Platform.
U.S. Appl. No. 60/868,767, filed Dec. 6, 2006, Titled: Alternative Payment Platform.
U.S. Appl. No. 60/869,899, filed Dec. 13, 2006, Titled: Alternative Payment Platform.
U.S. Appl. No. 60/914,298, filed Apr. 26, 2007, Titled: Alternative Payment Platform.
U.S. Appl. No. 14/076,125, filed Nov. 8, 2013, Titled: Systems and Methods for Offer Selection.
Wall , "Affliates-Integration: Join the Party", New Media Age, Feb. 21, 2008, pp. 23-24.

* cited by examiner

US 9,684,914 B1

TECHNIQUES FOR REAL-TIME DYNAMIC PRICING

BACKGROUND

In an electronic marketplace, items may be offered for consumption. Each item may be associated with pricing information indicating an offer price provided by the electronic marketplace service provider, and at least one third-party offer price provided by at least one third-party provider (e.g., a merchant) of the item. Merchants may attempt to determine the current pricing information associated with the item through scraping the electronic marketplace. "Scraping" refers to software data extraction techniques that include accessing hyperlinks within a website and recording the data found therein. Furthermore, the merchants may attempt to update an offer price of an item even though the item may not be currently in high demand. Scraping and excessive price updating by third-party providers, especially for low-demand items, may cost the electronic marketplace service provider great expense. Thus, techniques that reduce the processing requirements of the electronic marketplace service provider with regards to merchant pricing interactions are desirable.

BRIEF DESCRIPTION OF THE DRAWINGS

Various embodiments in accordance with the present disclosure will be described with reference to the drawings, in which.

DETAILED DESCRIPTION

Figure 1:
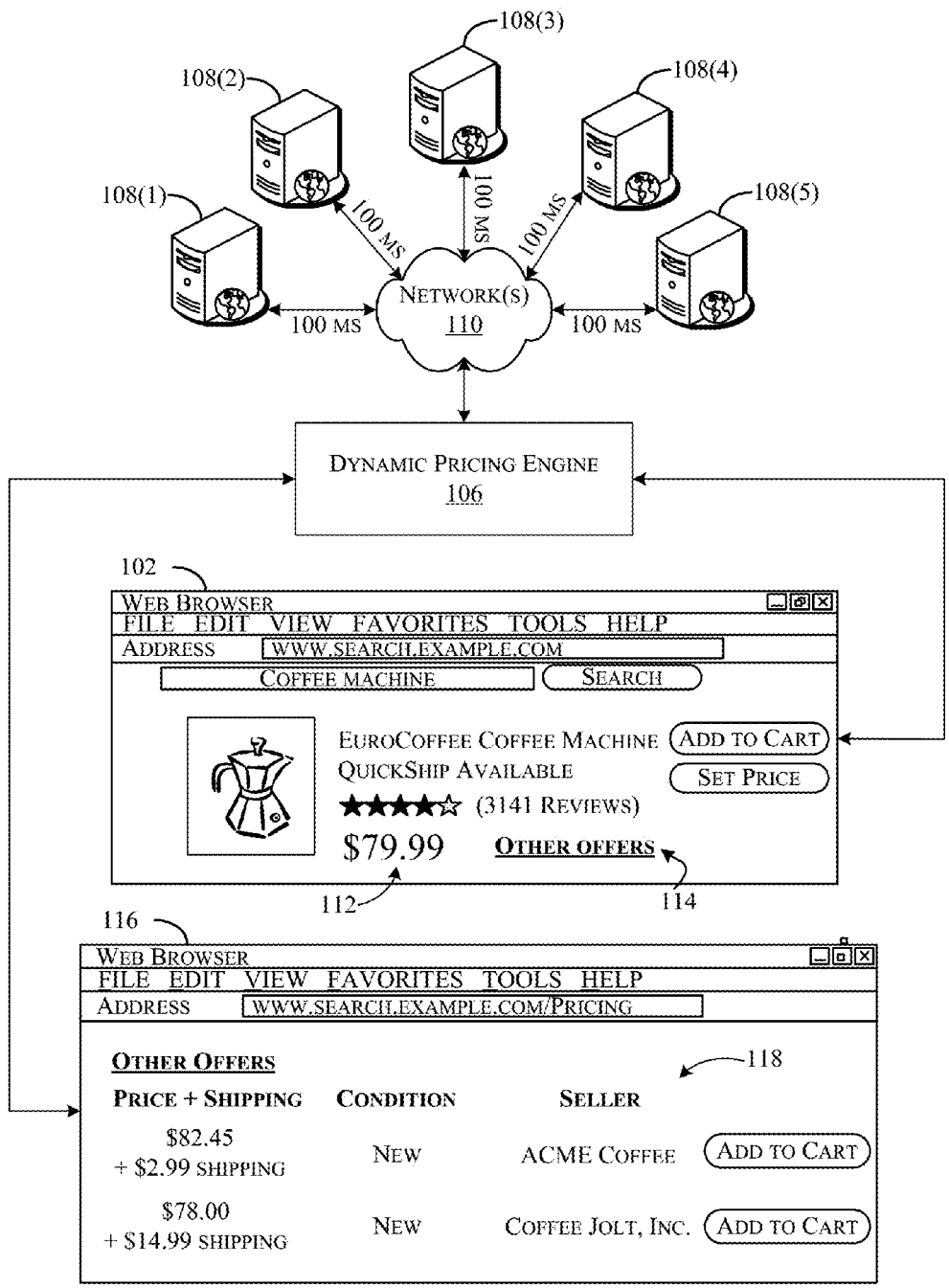
FIG. 1 is a data flowchart that illustrates a method for utilizing a dynamic pricing engine in accordance with at least one embodiment.

In the following description, various embodiments of the present disclosure will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process described may be performed under the control of one or more computer systems configured with specific computer-executable instructions and may be implemented as code (e.g., executable instructions, one or more computer programs or one or more applications) executing collectively on one or more processors, by hardware or combinations thereof. The code may be stored on a non-transitory computer-readable storage medium, for example, in the form of a computer program including a plurality of instructions executable by one or more processors. The computer-readable storage medium may be non-transitory.

As used herein, a "merchant" is intended mean a third-party provider of one or more items offered for consumption on an electronic marketplace. As used herein, a "first-party merchant" is intended to mean the electronic marketplace service provider in its role as a provider of items offered for consumption. As used herein, an "electronic marketplace" includes a computer-facilitated market for participants (e.g., buyers and sellers) to conduct transactions including commercial and/or financial transactions. Fulfillment of such transactions may occur using a fulfillment center, a service center, a warehouse, a retail store, a delivery vehicle including an aerial delivery vehicle, a pre-determined pickup location, a pre-determined drop-off location, a delivery locker, a vending machine, and/or any suitable form of delivery. As used herein, a "price" may include a purchase price, a rental price, a leasing price, or any suitable type of price. As used herein, a "secondary offer" is intended to include an additional offer other than an offer originally solicited including, but not limited to, bundles, up-sells, cross-sells and discounts.

Techniques described herein are directed to systems, methods, and non-transitory computer readable mediums that enable an electronic marketplace service provider to reduce wasteful processing. In accordance with at least one embodiment, a dynamic pricing engine may be utilized to reduce the amount of processing occurring in an electronic marketplace due to merchant pricing updates. For instance, a user may utilize an electronic device to access an item offered for consumption on an electronic marketplace. Accessing the item may constitute a triggering event. As a result of a triggering event, the dynamic pricing engine may receive information associated with the item and send an offer request to one or more merchants. In at least one embodiment, information associated with the user may also be sent in the offer request. Each merchant may respond or ignore such an offer request. If responding, a merchant may include offer information including pricing information associated with the offer. Pricing information may include, but is not limited to, a purchase price, a lease price, a rental price, and/or delivery pricing information. Additionally, the merchant may include in the offer, a secondary offer including any suitable combination of bundle information, up-sell information, cross-sell information, and/or discount information.

In accordance with at least one embodiment, received merchant offers may be combined with a first-party merchant offer to create a set of offers from which an item price may be determined. Each of the set of offers may be scored. The score may be based on various factors including, but not limited to, price, delivery information, and secondary offer(s) associated with the item. Based on the scores, a highest score may be selected and featured as the primary price displayed with the item. Additional offers, other than the highest scored offer, may be associated with the item and made available to the user.

In accordance with at least one embodiment, a user may first specify a price for which they wish to pay for the item. Once specified, the price may be included in an offer request to one or more merchants. The merchants may use the specified price when determining an offer price. Offers received from merchants may be scored in the manner described above. When an offer is received containing an offer price that falls below the user-specified price, the dynamic pricing engine may notify the user of the event.

In accordance with at least one embodiment, once offers are scored and a price is determined for the item, the electronic marketplace service provider may cache the offers and associated pricing information and lock the cache for future editing for a predetermined amount of time. In accordance with at least one embodiment, the cache may be locked for the user, for the session, or for all users of the electronic marketplace. While the cache is locked, the dynamic pricing engine may ignore any or all triggering events. Additionally, any offers received by the dynamic pricing engine may be discarded and ignored. Upon elapse of the predetermined amount of time, the dynamic pricing engine may resume processing of triggering events and offer receipts. The predetermined amount of time may be based on information associated with the item including, but not limited to, sales information including sales volume and rates of change with respect to number of sales during specified time periods, historical price fluctuation information including rates of change of price with respect to items and types of items, and network traffic information including traffic volume and rates of change of amounts of network traffic associated with items an types of items.

In accordance with at least one embodiment, a user may use an electronic input/output device to obtain an item for which pricing offers have been received. For example, the user may browse the contents of the marketplace electronically until he finds an item he wishes to obtain. The user, upon selecting the item, may cause a number of received offers to be scored as described above. The user may select an offered price from a particular merchant by adding the item to his shopping cart. Additionally, or alternatively, the user may select an option to "checkout" of the electronic marketplace (e.g., attempt to commit a transaction involving the item). In response to the user's selection, the dynamic pricing engine may send an offer request to one or more merchants in order to ascertain item availability and/or pricing information. If the item is no longer available from the particular merchant, and/or if pricing information has changed for that merchant, the user may be notified and/or given the opportunity to select the item from an alternative merchant. If the item is still available and pricing has not changed, the user may proceed with the typical process of obtaining the item including entering payment and shipping information.

In accordance with at least one embodiment, a user may browse through physical items in a physical store. The user may indicate some interest in a physical item. For instance, the user may use an electronic device to indicate interest in the item by scanning the bar code (e.g., a device that is part of the shelving/display, the user's smartphone, a scanner) though any suitable means for generating an item request may be used. Once the item is requested, the system may, in a similar manner as described above, send an offer request to one or more merchants. The merchants may respond with offers within a predetermined time period (e.g., 100 milliseconds). The offers may be scored and displayed to the user on the same electronic device use to issue the item request. In at least one example, the user may take the displayed information to a cashier to obtain the item for the provided price.

In accordance with at least one embodiment, a user may use an electronic device to search for items offered for consumption in an electronic marketplace. The user may then request to be presented a price for the item. In a similar fashion, as described above, the system may obtain offers from one or more merchants within a predetermined period. The system may score the offers based, in part, on where the item may be fulfilled. For instance, perhaps the electronic marketplace is capable of ascertaining a pickup location (e.g., a store, a locker) where the item is located. The locker, for instance, may be within a geographically proximate area of the user requesting the item. The offers may be scored by taking the geographical location of the item into account. The user may then be displayed a price corresponding to an item that is located 3 blocks away in a locker. The price for the item could, in some cases, be more than a price that the user could obtain the item elsewhere, but may still be scored as the highest due to its proximity to the user.

In accordance with at least one embodiment, a user may use an electronic input/output device (e.g., a touch screen) attached to a container of items (e.g., a locker) to ascertain the contents of the locker. For example, the user may browse the contents of the locker electronically until he finds an item he wishes to obtain. The user, upon selecting the item, may cause an offer request to be sent to one or more merchants. The merchants may respond within a predetermined period. The offers may be scored and the highest scored offer presented to the user. The user may accept or reject the offered price. If accepted, the user may be given access to a location in the locker containing the item.

FIG. 1 is a data flowchart that illustrates a method 100 for utilizing a dynamic pricing engine in accordance with at least one embodiment. In at least one example, a user may access an item detail page 102. An item detail page 102 may include information related to an item offered for consumption on an electronic marketplace. As used herein, the term "item" is intended to apply to a good or a service offered with the electronic marketplace. Upon selection of the item detail page, a triggering event that includes item information may be sent from the electronic marketplace to the dynamic pricing engine 106. The dynamic pricing engine 106 may transmit the item information and, potentially, user information in an offer request to merchant 108(1), merchant 108(2), merchant 108(3), merchant 108(4), and merchant 108(5), (collectively, merchants 108) communicating via network 110.

The transmission of the offer request may occur in real time or near real time. "Real time" may indicate events that are processed immediately or without intentional delay. For example, real time processing may be configured to optimize (e.g., minimize) processing delays with respect to absolute magnitude and/or statistical consistency including with respect to buffering and/or caching (e.g., optimizing and/or minimizing the use of such mechanisms). "Near real time" may indicate events that, subject to processing time and/or practical computer processing constraints (e.g., non-optimal computer operating system task scheduling), occur substantially immediately. In this context, offer request may occur substantially at the same time as an HTTP server responsible for loading the item detail page begins the process of serving the content necessary for the item detail page. The offer request may be transmitted as instantaneously as possible limited by a time-frame needed by the hardware/software to receive and/or access the selection of the item detail page 102, to collect information needed for the offer request, and to generate/transmit the offer request. In addition, the offer request-response exchange may occur with a timeframe such that its contribution to a total time to generate a web page to present to a user is relatively small. For example, its contribution may be imperceptible or substantially imperceptible to the user. As another example, its relative contribution to the total time to generate the web page may be 50%, 20%, 10% or less. As yet another example, its absolute contribution to the total time to generate the web page may be 500 milliseconds, 200 milliseconds, 100 milliseconds or less.

The use of five merchants is intended as an illustrative example, any suitable number of merchants may interact with the dynamic pricing engine 106. The offer request may include an offer time, the offer time indicating the amount of time merchants 108 have to respond until the item price is locked. Additionally, an offer request may include, but is not limited to, information associated with the item, information associated with the user, and/or the user-specified price. Information associated with the item may include, but is not limited to, sales volume information, sales trend information, conversion rates, and/or item inventory of other merchants with respect to the item. Information associated with the user may include, but is not limited to demographic information, geographic information, past purchase history, and/or past browsing history associated with the user. While the item price is locked, dynamic pricing engine 106 may ignore subsequent triggering events and offers received from merchants 108. During lock time, the amount of processing required of the electronic marketplace service provider may be reduced. In at least one example, the item price may be locked for a particular amount of time (e.g., 15 minutes). The lock may apply to a particular user, a particular session, to all users of the electronic marketplace, or to a subset of users of the electronic marketplace. Upon elapse of the particular amount of time, the dynamic pricing engine 106 may unlock the price and future triggering events and offer receptions may, once again, be processed.

In at least one embodiment, upon a triggering event being received, (e.g., as a result of at least one of selection of a detail page, inclusion in a search result, detection of a price change regarding an item being offered via a third-party website, receipt of a price check request from a mobile application, or receipt of a user-specified item price), the dynamic pricing engine 106 may initiate multiple offer requests to be sent to merchants 108. In such an example, the dynamic pricing engine 106 may transmit an initial offer request giving merchants 108 a specific amount of time (e.g., 100 milliseconds) to respond. Upon elapse of the specific amount of time, dynamic pricing engine 106 may initiate one or more subsequent offer requests, each potentially including a specific time for response. The subsequent offer requests may include pricing information from the last round(s) of offer requests such that merchants 108 may be informed of other merchant's offer activity. In this manner, merchants 108 may be enabled to submit multiple offers to the dynamic pricing engine 106.

In accordance with at least one embodiment, once an offer time has elapsed, dynamic pricing engine 106 may score any or all received offers as well as any available first-party offers, according to a predetermined scheme. Score may be based on information including, but not limited to, pricing information, delivery options, geographic location of the item and/or user, tax information, and/or secondary offers. A highest scored offer (e.g., based on the best price considering delivery costs) may be selected and the corresponding offer price 112 may be featured on item detail page 102. One or more other offers (e.g., scored offers other than the highest scored offer) may be accessible to the user (via hyperlink 114 resulting in navigation to "other offer" page 116). In at least one example, the other offers may be sent from dynamic pricing engine 106 and may be provided to the user in a list 118 on "other offer" page 116. In at least one example, a subset of the other offers may be provided to the user. In still another example, all offers (including both third-party and first-party offers) may be presented to the user as featured prices, regardless of score, or alternatively, ordered by score.

Thus, a method for reducing pricing transactions requiring processing on an electronic marketplace is enabled.

Figure 2:
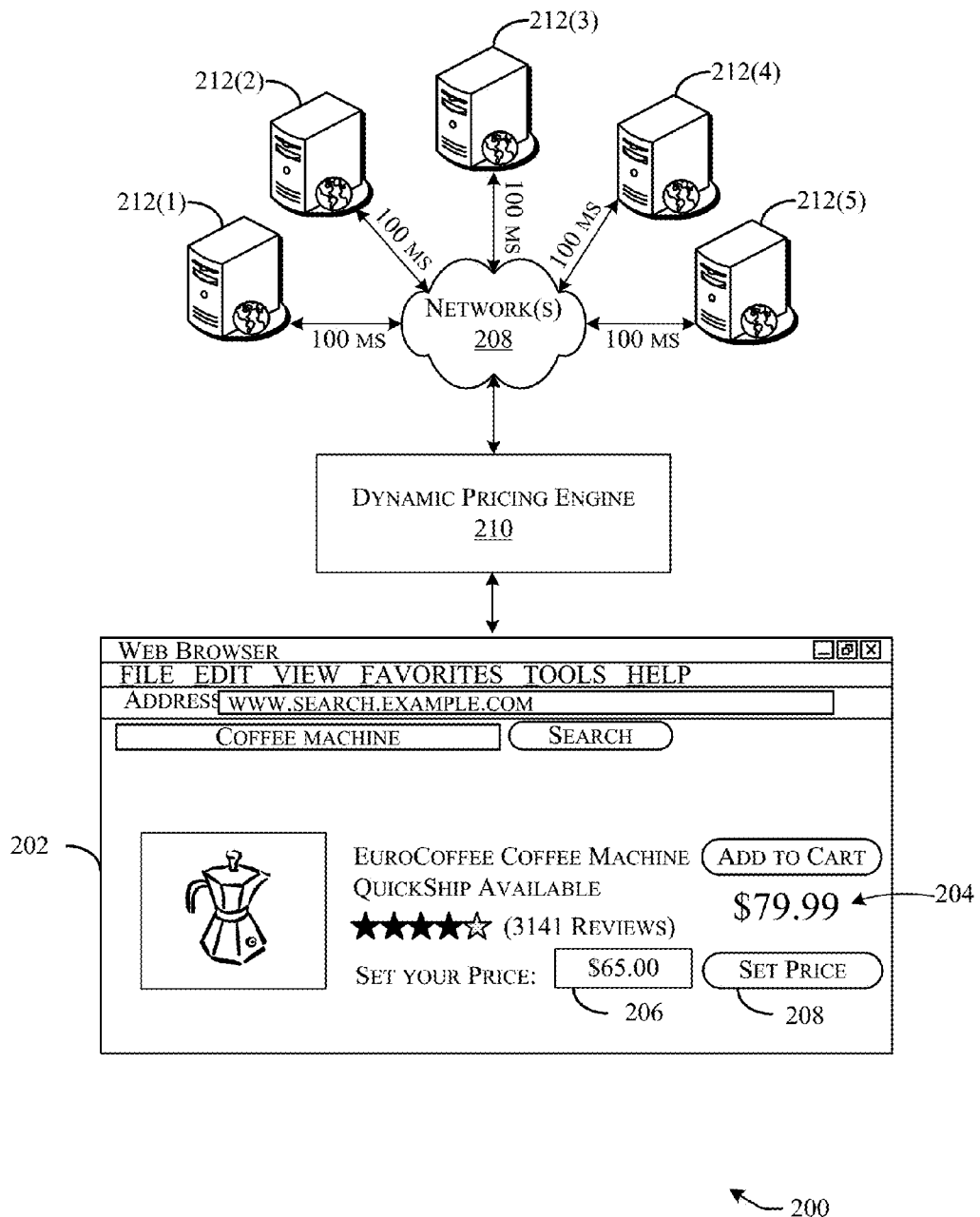
FIG. 2 illustrates another method for utilizing the dynamic pricing engine in accordance with at least one embodiment.

FIG. 2 illustrates another method for utilizing the dynamic pricing engine in accordance with at least one further embodiment. In at least one example, a user of an electronic marketplace may navigate to an item detail page 202. The item may have a featured price 204 displayed, though a predetermined featured price 204 is not required. The user may specify a price he wishes to pay to obtain the item. In at least one example, the user may enter this price in box 206. Selection of the "set price" button 208 may constitute a triggering event resulting in pricing request, including the user-specified price, to be sent to a dynamic pricing engine 210 (e.g., the dynamic pricing engine 106 in FIG. 1). Dynamic pricing engine 210 may receive the pricing request including item information, information associated with the user, and/or the user-specified price. Dynamic pricing engine 210 may transmit one or more offer requests to merchant 212(1), merchant 212(2), merchant 212(3), merchant 212(4), and merchant 212(5) (collectively, merchants 212). Each offer request may include, but is not limited to, information associated with the item, information associated with the user, and/or the user-specified price. Information associated with the item may include, but is not limited to, sales volume information, sales trend information, conversion rates, and/or item inventory of other merchants with respect to the item. Information associated with the user may include, but is not limited to demographic information, geographic information, past purchase history, and/or past browsing history associated with the user. Merchants 212 may utilize this information to provide one or more offers. Upon receipt of the one or more offers, dynamic pricing engine 210 may score the received offers in a similar manner as described in FIG. 1. Additionally, dynamic pricing engine 210 may determine whether the user-specified price is met. If the user-specified price has been met, dynamic pricing engine 210 may cause the user to be notified. Notification may be electronic in nature and may comprise an email, a text message, or any suitable form of electronic communication.

Figure 3:
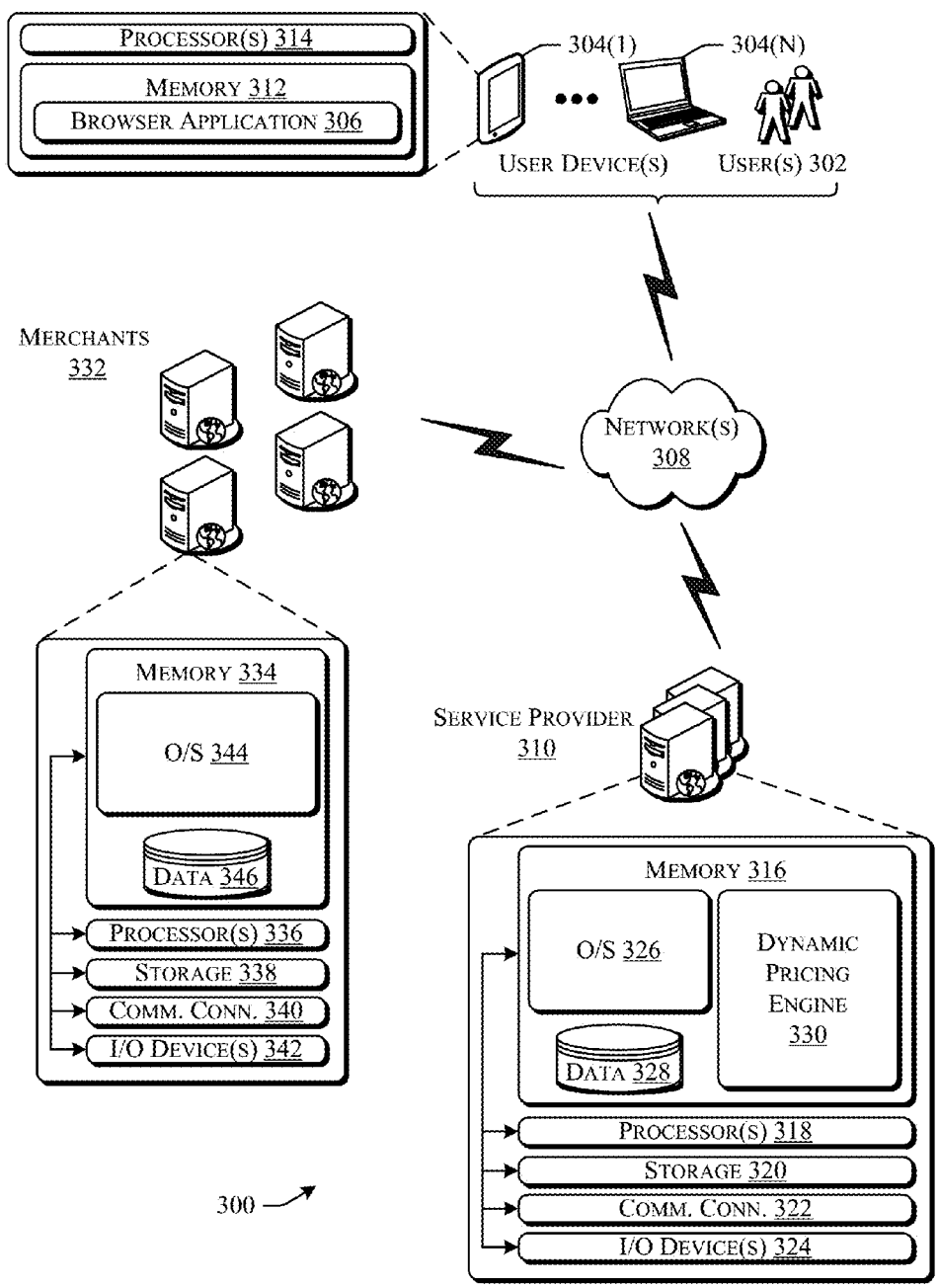
FIG. 3 illustrates an example architecture for providing the dynamic pricing engine, in accordance with at least one embodiment.

FIG. 3 illustrates an example architecture 300 for providing the dynamic pricing engine (e.g., the dynamic pricing engine 106 in FIG. 1), in accordance with at least one embodiment. In architecture 300, one or more users 302 (e.g., consumers of an electronic marketplace) may utilize user computing devices 304(1)-(N) (collectively, user computing devices 304) to access a browser application 306 (e.g., an application that enables the consumer to browse items offered by an electronic marketplace) or a user interface accessible through the browser application 306 via one or more networks 308. In some aspects, the browser application 306 may be hosted, managed, and/or provided by a computing resources service or service provider, such as by utilizing one or more service provider computers 310. The one or more service provider computers 310 may, in some examples, provide computing resources such as, but not limited to, client entities, low latency data storage, durable data storage, data access, management, virtualization, cloud-based software solutions, electronic content performance management, etc. The one or more service provider computers 310 may also be operable to provide web hosting, computer application development, and/or implementation platforms, combinations of the foregoing, or the like to the one or more users 302.

In some examples, the networks 308 may include any one or a combination of many different types of networks, such as cable networks, the Internet, wireless networks, cellular networks and other private and/or public networks. While the illustrated example represents the users 302 accessing the browser application 306 over the networks 308, the described techniques may equally apply in instances where the users 302 interact with the service provider computers 310 via the one or more user computing devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 306 may allow the users 302 to interact with the service provider computers 310, such as to access information associated with items offered for consumption via an electronic marketplace. The one or more service provider computers 310, perhaps arranged in a cluster of servers or as a server farm, may host the browser application 306 and/or cloud-based software services. Other server architectures may also be used to host the browser application 306 and/or cloud-based software services. The browser application 306 may be capable of handling requests from many users 302 and serving, in response, various user interfaces that can be rendered at the user computing devices 304 such as, but not limited to, perceived latency or the like. The browser application 306 can provide any type of website that supports user interaction, including search engine sites. As discussed above, the described techniques can similarly be implemented outside of the browser application 306, such as with other applications running on the user computing devices 304.

The user computing devices 304 may be any suitable type of computing device such as, but not limited to, a mobile phone, a smart phone, a desktop computer, a personal digital assistant (PDA), a laptop computer, a tablet PC, an electronic book (e-book) reader, set-top box, kiosk, locker, vending machine, etc. User computing devices 304 may include a gyroscope, an accelerometer, an altimeter, or any suitable hardware sensor capable of detecting movement or orientation of user computing devices 304. In some examples, the user computing devices 304 may be in communication with the service provider computers 310 via the networks 308, or via other network connections. Additionally, the user computing devices 304 may be part of the distributed system managed by, controlled by, or otherwise part of the service provider computers 310.

In one illustrative configuration, the user computing devices 304 may include at least one memory 312 and one or more processing units (or processor(s)) 314. The processor(s) 314 may be implemented as appropriate in hardware, computer-executable instructions, firmware, or combinations thereof. Computer-executable instructions or firmware implementations of the processor(s) 314 may include computer-executable or machine-executable instructions written in any suitable programming language to perform the various functions described.

The memory 312 may store program instructions that are loadable and executable on the processor(s) 314, as well as data generated during the execution of these programs. Depending on the configuration and type of user computing devices 304, the memory 312 may be volatile (such as random access memory (RAM)) and/or non-volatile (such as read-only memory (ROM), flash memory, etc.). The user computing devices 304 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 312 may include multiple different types of memory, such as static random access memory (SRAM), dynamic random access memory (DRAM), or ROM.

Turning to the contents of the memory 312 in more detail, the memory 312 may include an operating system and one or more application programs, modules, or services for implementing the features disclosed herein including at least the perceived latency, such as via the browser application 306 or dedicated applications (e.g., smart phone applications, tablet applications, etc.). The browser application 306 may be configured to receive, store, and/or interact with service provider computers 310. Additionally, the memory 312 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 310 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the service provider computers 310 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 310 may be in communication with the user computing devices 304 and/or other service providers via the networks 308, or via other network connections. The service provider computers 310 may include one or more servers, perhaps arranged in a cluster, as a server farm, or as individual servers not associated with one another. These servers may be configured to implement the tilt display functionality described herein as part of an integrated, distributed computing environment.

In one illustrative configuration, the service provider computers 310 may include at least one memory 316 and one or more processing units (or processor(s)) 318. The processor(s) 318 may be implemented as appropriate in hardware, computer-executable instructions, firmware, or combinations thereof. Computer-executable instructions or firmware implementations of the processor(s) 318 may include computer-executable or machine-executable instructions written in any suitable programming language to perform the various functions described.

The memory 316 may store program instructions that are loadable and executable on the processor(s) 318, as well as data generated during the execution of these programs. Depending on the configuration and type of service provider computers 310, the memory 316 may be volatile (such as RAM) and/or non-volatile (such as ROM, flash memory, etc.). The service provider computers 310 or servers may also include additional storage 320, which may include removable storage and/or non-removable storage. The additional storage 320 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 316 may include multiple different types of memory, such as SRAM, DRAM, or ROM.

The memory 316, and the additional storage 320, both removable and non-removable, are all examples of computer-readable storage media. For example, computer-readable storage media may include volatile or non-volatile, removable or non-removable media implemented in any suitable method or technology for storage of information such as computer-readable instructions, data structures, program modules, or other data. The memory 316 and the additional storage 320 are examples of computer storage media. Additional types of computer storage media that may be present in the service provider computers 310 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 310. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 310 may also contain communications connection(s) 322 that allow the service provider computers 310 to communicate with a stored database, another computing device or server, user terminals and/or other devices on the networks 308. The service provider computers 310 may also include I/O device(s) 324, such as a keyboard, a mouse, a pen, a voice input device, a touch input device, a display, speakers, a printer, etc.

Turning to the contents of the memory 316 in more detail, which will be described in further detail in FIG. 4, the memory 316 may include an operating system 326, one or more data stores 328, and/or one or more application programs, modules, or services for implementing the features disclosed herein including a dynamic pricing engine 330.

In accordance with at least one embodiment, the merchant computers 332 may be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that, in some embodiments, the merchant computers 332 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the merchant computers 332 may be in communication with the user computing devices 304 and/or service provider computers 310 via the networks 308, or via other network connections. The merchant computers 332 may include one or more servers, perhaps arranged in a cluster, as a server farm, or as individual servers not associated with one another.

In one illustrative configuration, the merchant computers 332 may each include at least one memory 334 and one or more processing units (or processor(s)) 336. The processor(s) 336 may be implemented as appropriate in hardware, computer-executable instructions, firmware, or combinations thereof. Computer-executable instructions or firmware implementations of the processor(s) 336 may include computer-executable or machine-executable instructions written in any suitable programming language to perform the various functions described.

The memory 334 may store program instructions that are loadable and executable on the processor(s) 336, as well as data generated during the execution of these programs. Depending on the configuration and type of merchant computers 332, the memory 334 may be volatile (such as RAM) and/or non-volatile (such as ROM, flash memory, etc.). The merchant computers 332 or servers may also include additional storage 338, which may include removable storage and/or non-removable storage. The additional storage 338 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 334 may include multiple different types of memory, such as SRAM, DRAM, or ROM.

The memory 334, and the additional storage 338, both removable and non-removable, are all examples of computer-readable storage media. For example, computer-readable storage media may include volatile or non-volatile, removable or non-removable media implemented in any suitable method or technology for storage of information such as computer-readable instructions, data structures, program modules, or other data. The memory 334 and the additional storage 338 are examples of computer storage media. Additional types of computer storage media that may be present in the merchant computers 332 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the merchant computers 332. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The merchant computers 332 may also contain communications connection(s) 340 that allow the merchant computers 332 to communicate with a stored database, another computing device or server, user terminals and/or other devices on the networks 308. The merchant computers 332 may also include I/O device(s) 342, such as a keyboard, a mouse, a pen, a voice input device, a touch input device, a display, speakers, a printer, etc.

Turning to the contents of the memory 334 in more detail, the memory 334 may include an operating system 344, one or more data stores 346, and/or one or more application programs, modules, or services for implementing the features disclosed herein.

Figure 4:
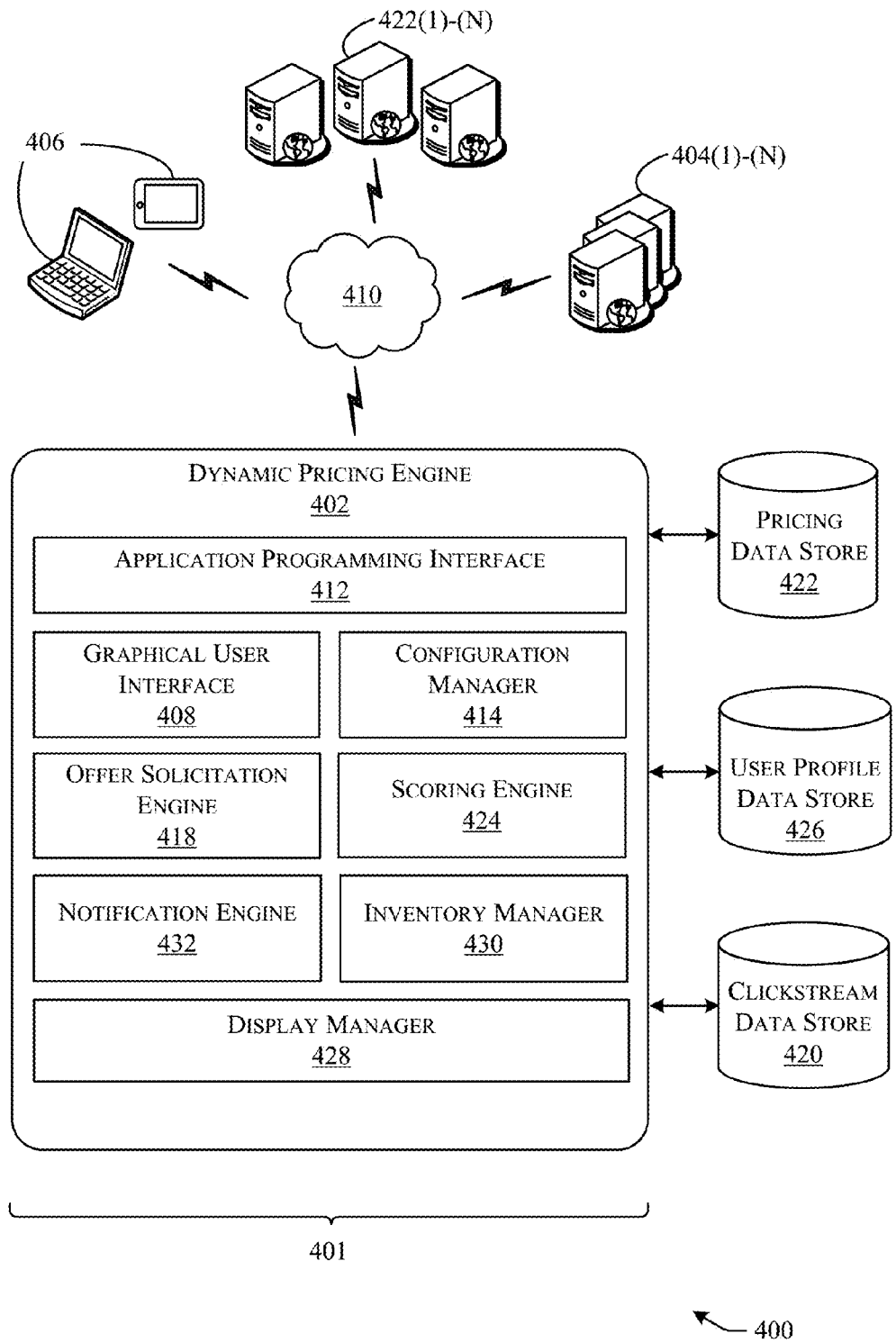
FIG. 4 schematically illustrates an example computer architecture for the dynamic pricing engine, including a plurality of modules that may carry out various embodiments.

FIG. 4 schematically illustrates an example computer architecture 400 for a dynamic pricing engine 402 (e.g., the dynamic pricing engine 106 in FIG. 1), including a plurality of modules 401 that may carry out various embodiments. The modules 401 may be software modules, hardware modules, or a combination thereof. If the modules 401 are software modules, the modules 401 can be embodied on a computer-readable medium and processed by a processor in any of the computer systems described herein. It should be noted that any module or data store described herein, may be, in some embodiments, a service responsible for managing data of the type required to make corresponding calculations. The modules 401 may be configured in the manner suggested in FIG. 4 or may exist as separate modules or services external to the dynamic pricing engine 402.

In accordance with at least one embodiment, a method is enabled by reducing processing requirements of an electronic marketplace. For example, the dynamic pricing engine 402 may be a component of service provider computers 404(1)-(N) (e.g., service provider computers 310, collectively, service provider computers 404). Alternatively, dynamic pricing engine 402 may exist as a separate engine external to service provider computers 404.

In accordance with at least one embodiment, a user may utilize user devices 406 (e.g., user computing devices 304) to access graphical user interface 408, a component of the dynamic pricing engine 402. The user may enter profile information via the graphical user interface 408 communicating via network 410 (e.g., networks 308). Alternatively, the user may enter profile information via a graphical user interface provided by service provider computers 404.

In accordance with at least one embodiment, user profile information may be received by dynamic pricing engine 402 via application programming interface 412, a component of the dynamic pricing engine 402. User profile information may include, but is not limited to, user demographic information, name, address, preferred shipping options, club membership information, past purchase information, and billing information. Configuration manager 414, another component of the dynamic pricing engine 402, may be configured to receive such information. Configuration manager 414 may create a user profile to store the received user profile information. The user profile may be stored on user profile data store 416, a data store responsible for storing information of this type.

In accordance with at least one embodiment, the user may utilize user devices 406 to select an item to view via an electronic marketplace. Once selected, user devices 406 may trigger an event indicating a price is needed for the selected item. As discussed above, a triggering event may result from stimuli including, but not limited to, a selection of a detail page, an inclusion of an item in a search result, a determination that the item price has historically fluctuated over a threshold amount, a detection of a price change regarding an item offered on the electronic marketplace that is also being offered via a third-party website, a detection of the price change occurring at the third-party website, a determination that a conversion rate for the item is below a particular threshold, a receipt of a price check request, and a receipt of a user-specified item price. Offer solicitation engine 418, a component of the dynamic pricing engine 402, may be configured to receive the triggering event. Offer solicitation engine 418 may extract item information and/or user information from the triggering event. Additionally, offer solicitation engine 418 may interact with clickstream data store 420 to retrieve clickstream data associated with the user. Clickstream data may include information indicating what web pages the user has visited. Offer solicitation engine 418 may generate an offer request utilizing such information. The offer request may be transmitted to one or more merchants 422. The offer request may designate a particular time period by which the one or more merchants 422 must respond in order to enter an offer that will be processed.

In at least one embodiment, as a result of receiving the offer request, one or more merchants 422 may respond with one or more offers. In at least one example, the offer may include an item price, delivery offers, tax information, and/or a secondary offer the merchant may wish to include with the offer. Dynamic pricing engine 402, upon determining that offers are currently being accepted, may receive the one or more offers from the one or more merchants 422. Each offer may include an indicial of authenticity indicating that the offer is genuine. For instance, offers may include cryptographic keys, digital signatures, signed certificates, or any suitable means for assuring authenticity. Future disputes with the merchant may utilize the cryptographic key as evidence that the merchant did, in fact, submit the offer in question. Scoring engine 424, a component of the dynamic pricing engine 402, may be configured to receive the one or more offers. Upon receipt, scoring engine 424 may store the offers, including any corresponding cryptographic keys, in pricing data store 426. Additionally, scoring engine 424 may interact with pricing data store 426 to ascertain whether or not any first-party offers exist. If a first-party offer exists for the item, the first-party offer information may be obtained by scoring engine 424.

In accordance with at least one embodiment, scoring engine 424 may score the one or more merchant offers along with any determined first-party offers. Scores may be represented by a numeric value between a range (e.g., 1 through 10), by a one-dimensional vector, by a multidimensional vector, or any suitable representation of a score. Additionally, scores may be based on various factors associated with the offer including, but not limited to, price, delivery options, tax information, and/or secondary offers. For instance, an offer including a purchase price of $79.99 with $5.00 shipping fees may receive a lower score than an offer containing $79.99 with $3.00 shipping fees. Additionally, the type of delivery available may affect the score. For instance, offers that indicate the item may be delivered within 2 days may be scored higher than offers that indicate the item may take longer than 2 days to be delivered. In one example, the score may be affected due to the existence and type of multiple delivery options available for the item. For instance, 1-day shipping may be $10.00 but may be free if the user has a membership with the retailer. 2-day shipping may be $5.00 but may be free if, for instance, the user uses a particular credit card to make his purchase. 5-day shipping may be free regardless of other factors. In at least one case, the existence of one or more of the delivery options may increase or decrease the score. For example, the user may prefer 1-day shipping due to the fact that the user has a membership with the retailer and gets free shipping through the membership. Thus, an item that has membership pricing/ shipping available may be scored more favorably than items that do not have membership pricing/shipping available.

In at least one example, items that can be bundled with other item (e.g., for a discounted price than normally charged for the combination) may positively affect the score. As a further example, an offer with a purchase price of $79.99 that further includes a bonus item worth $9.99 may be scored higher than an offer with a purchase price of $72.00 that does not include a bonus item. Similarly, items scores may be positively affected if the item can be bundled with other items or if obtaining the item includes additional options (e.g., options for installation). In this case, the dynamic pricing engine 402 may determine that the overall deal for the offer with the $79.99 purchase price is a better overall deal than the offer with the $72.00 purchase price. In at least one example, the item may be a service (e.g., house painting, tax preparation, tutoring/educational services, etc.) offered by a service provider (e.g., HVAC contractor, plumbers, electricians, etc). Factors affecting scores for services may include, but are not limited to, information pertaining to the service provider's reputation, geographical location, popularity, inclusion of a discount, offers for additional services/items upon purchase of the service, to name a few.

In accordance with at least one embodiment, a feature price for the item may be determined based on one or more offer scores. In at least one example, an offer with the lowest price may be selected as the feature score. In another non-limiting example, an offer with the best overall value may be selected as the feature score. The item score may take into account user preferences and/or or historical information related to the user including clickstream data and profile information. Additionally, item scores may be based on filtering requested by the user (e.g., filtering by brand, price, color, merchant, type of offer, etc.). Items that come with a course that teaches the user about the item (e.g., a course offered regarding how to access photos/videos stored on a NAS from a smartTV/set-top box) may be scored more favorably than items for which no course is available. Scoring engine 424 may store scores in pricing data store 426. Scoring engine 424 may, in some examples, store the offers and corresponding scores in a cache associated with the item. The cache may be time-stamped (e.g., with the time the scores were determined).

In accordance with at least one embodiment, scoring engine 424 may communicate the scored offers to display manager 428, another component of dynamic pricing engine 402. Display manager 428 may be responsible for providing the feature price associated with the highest scored offer and/or other prices associated with other offers that are not the highest scored offer. The display manager 428 may cause the user to be provided with prices corresponding to the order of offer scores (e.g., in a list from highest to lowest).

In at least one embodiment, another user may utilize user devices 406 to request an item via an electronic marketplace. Scoring engine 424 may be configured to receive such a triggering event. Scoring engine 424 may query pricing data store 426 in order to ascertain whether or not a feature price has been determined for the item. If a price has been decided, scoring engine 424 will determine whether or not a particular time period (e.g., 15 minutes) has elapsed since the feature price was determined. In at least one example, scoring engine 424 may make such a determination by ascertaining the "lock" period (e.g., the time required between allowing pricing updates) and calculating whether the received triggering event is occurring within the "lock" period. If the triggering event is received during the "lock" period, scoring engine 424 may discard such a triggering event. Additionally, offers received by the dynamic pricing engine 402 may be ignored if determined to be received within the "lock" period.

In at least one embodiment, an offer from a merchant of merchants 422 may include tiered pricing. In a tiered pricing scheme, the item price may change over time. Perhaps the merchant offers the price for a limited time, until a certain number of items are sold, or while supplies last. For instance, the merchant might specify that the item may be sold at $50 for the first 10 purchased, but subsequently sold at $55. Inventory manager 430 may detect item transactions and determine when the item has been sold from the merchant 10 times. Upon such a determination, inventory manager 430 may cause scoring engine 424 to re-score offers contained in pricing data store 426 associated with the item.

In accordance with at least one embodiment, a user may select a minimum and/or maximum price that he wishes to pay for an item. The minimum or maximum price may be included by the offer solicitation engine 418 in any or all offer requests transmitted for the item. After receipt of the offers from the merchants, before, during, or after scoring occurs, dynamic pricing engine 402 may determine that one or more offers fall under the maximum price or over the minimum price requested. Upon such determination, notification engine 432, a component of dynamic pricing engine 402, may electronically notify the user that a merchant has offered a price corresponding to the user-selected price requested for the item.

Figure 5:
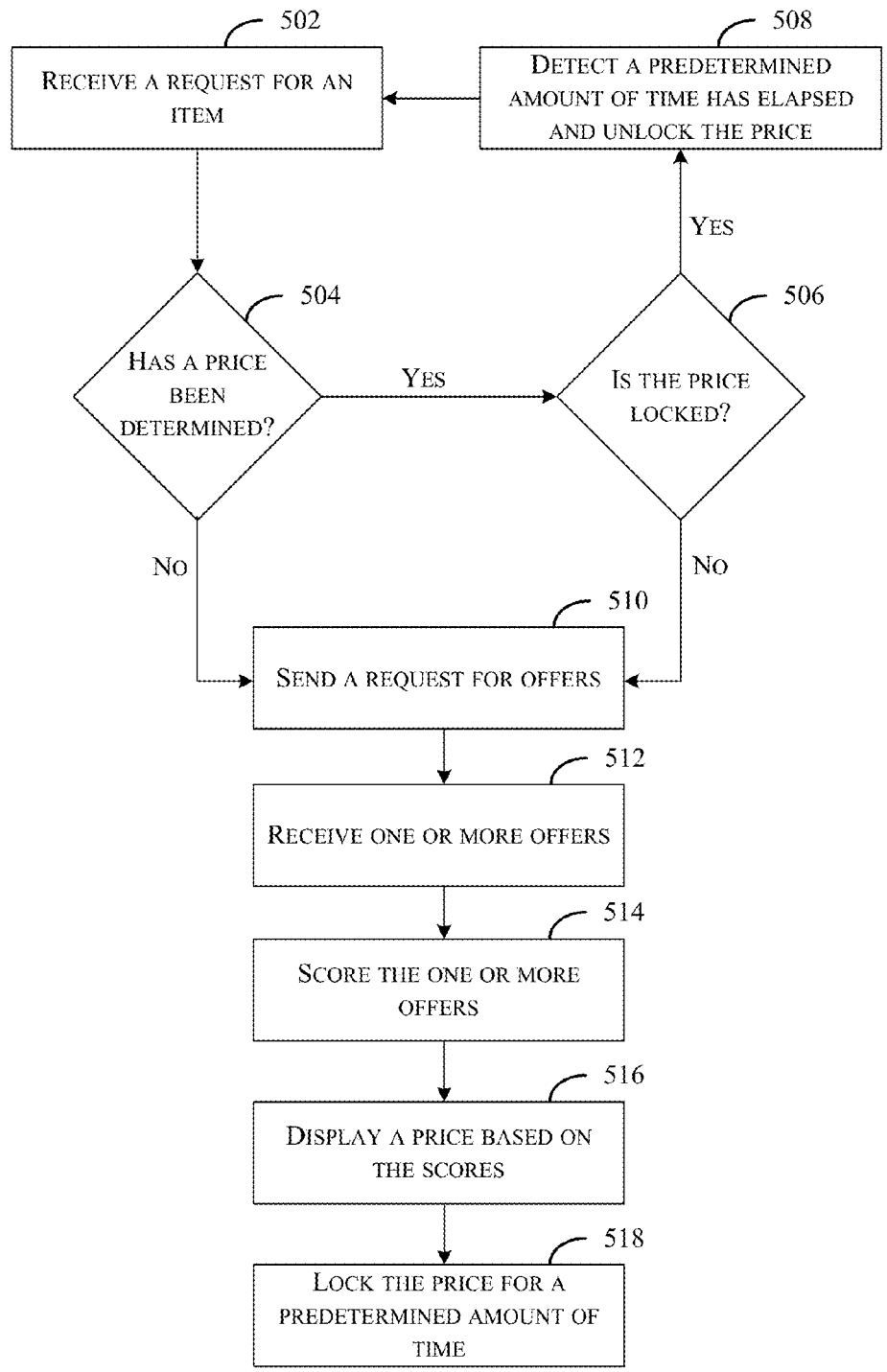
FIG. 5 is a flowchart illustrating a method for utilizing the dynamic pricing engine described herein, in accordance with at least one embodiment.

FIG. 5 is a flowchart illustrating a method 500 for utilizing the dynamic pricing engine described herein, in accordance with at least one embodiment. The flow may begin at 502 where a request may be received for an item. The request may occur due to a triggering event. At 504, the dynamic pricing engine (e.g., the dynamic pricing engine 106 of FIG. 1) may determine whether or not a price has been determined for the item. If the price has already been determined, the dynamic pricing engine may next ascertain whether or not the price is currently locked at 506. At 508, if the price is locked, the dynamic pricing engine may wait to unlock the price until it detects a predetermined amount of time has elapsed (e.g., 15 minutes since the price was locked, 15 minutes since last conversion). Alternatively, or additionally, the dynamic pricing engine may unlock the price after a predetermined number of requests for the items has occurred (e.g., after 50 item requests), and/or after a predetermined number of commercial transactions related to the item has occurred (e.g., after 100 sales). If the price is unlocked, the dynamic pricing engine may continue to process received item requests and/or merchant offers received.

In at least one embodiment, if a price has not been determined, or alternatively, if the price has been determined but is currently unlocked, an offer request may be sent by the dynamic pricing engine to one or more merchants at 510. At 512, one or more offers may be received from the one or more merchants by the dynamic pricing engine. Dynamic pricing engine may score the one or more items at 514 in a similar manner as described above. Once offers are scored, the dynamic pricing engine may display a price associated with the item, based on the determined scores at 518. Upon determining one or more offers to feature with the item, the dynamic pricing engine may lock the price for the item for a predetermined amount of time at 520.

Figure 6:
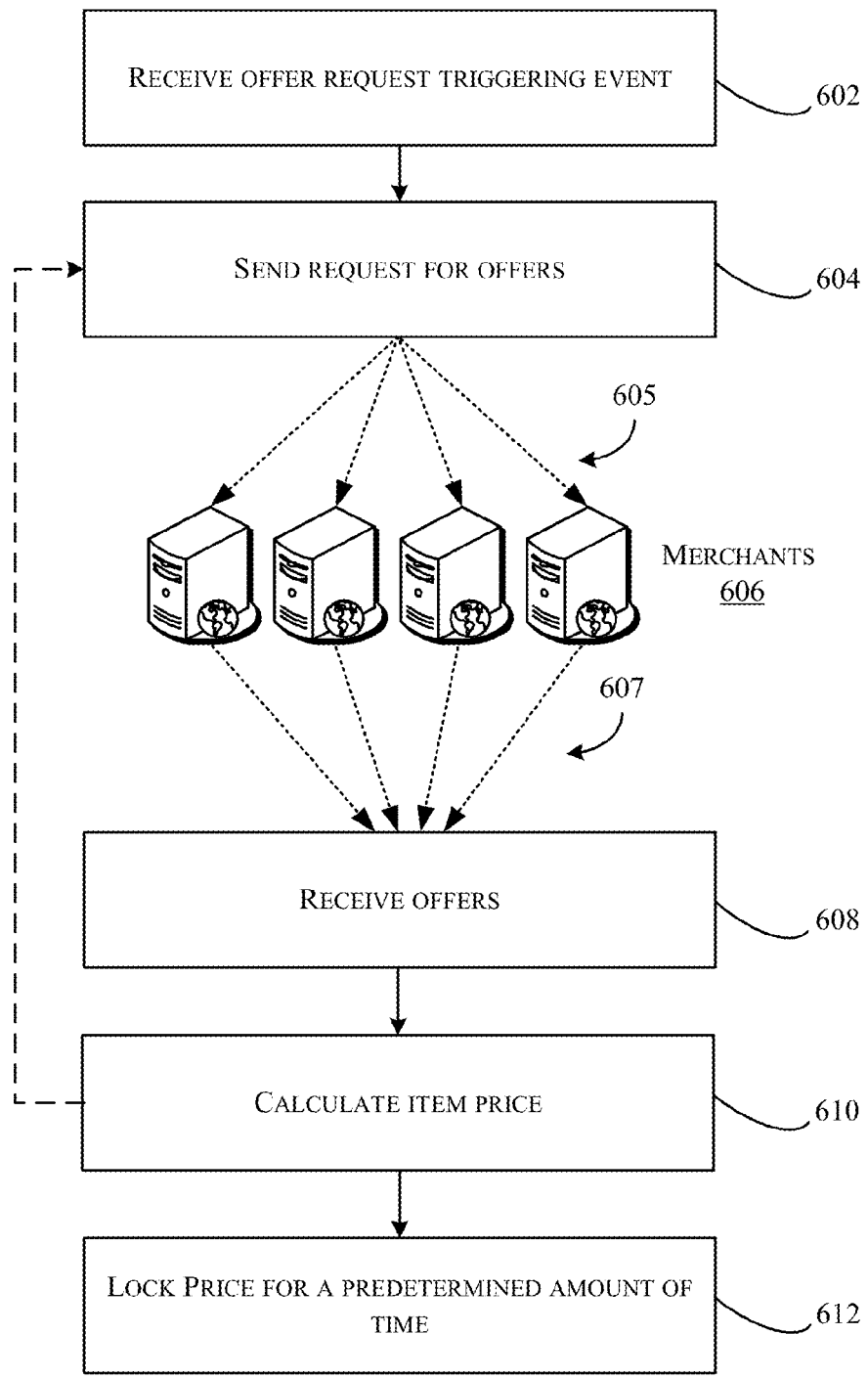
FIG. 6 is a flowchart illustrating an offer obtainment protocol that may be used by the dynamic pricing engine described herein, in accordance with at least one embodiment.

FIG. 6 is a flowchart illustrating an offer obtainment protocol 600 that may be used by the dynamic pricing engine (e.g., dynamic pricing engine 106 of FIG. 1) described herein, in accordance with at least one embodiment. The flow may begin at 602, where an offer request triggering event may be received by dynamic pricing engine 106. At 604, requests for offers may be sent to merchants 606 as depicted by arrows 605. In at least one example, offer requests may include item information and, potentially, user information. It should be appreciated that the offer request may be transmitted to one or more merchant computing devices, as depicted in FIGS. 1, 2, and 6, and/or the offer request may be transmitted to an offer engine authorized to make offers on behalf of one or more third-party merchants. An offer engine may operate under procedural rules specifying how a third-party provider would and/or desires to make an offer, as well as what the offer would contain if the third-party provider was responding to an offer request. For example, such rules may specify a profit goal (e.g., at least 5% averaged over no more than 100 transactions), a sales volume goal and/or cap, or any suitable electronic commerce goal. Based on these procedural rules the offer engine may generate offer responses on behalf of the third-party provider without needing to send an offer request to the third-party provider of the item. The offer engine may be a component of the dynamic pricing engine (e.g., the dynamic pricing engine 106 of FIG. 1) or the offer engine may be an engine provided by the electronic marketplace.

In accordance with at least one embodiment, offers are received at 608 from merchants 606 as depicted by arrows 607. An item price may be calculated at 610. Dynamic pricing engine may then send subsequent requests for offers at 604. Though the subsequent offers are depicted as occurring after calculation of an item price at 610, it should be appreciated that the dynamic pricing engine may transmit offer requests at any time. At 612, after one or more item price calculations, the item price may be locked for a predetermined amount of time, thus, preventing further processing of trigger events and/or offers during the predetermined amount of time.

Figure 7:
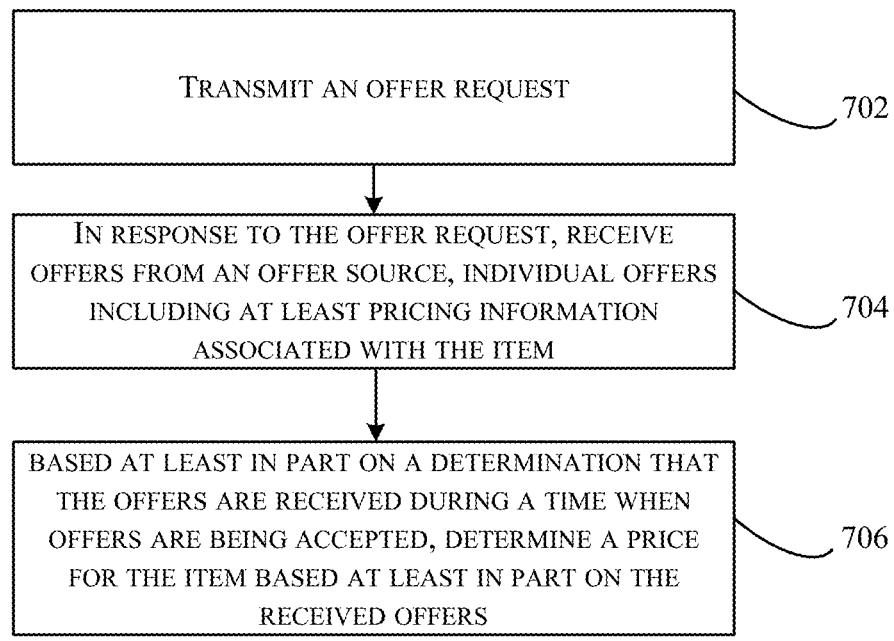
FIG. 7 is a flowchart illustrating a method for utilizing the dynamic pricing engine described herein, in accordance with at least one embodiment.

FIG. 7 is a flowchart illustrating a method 700 for utilizing the dynamic pricing engine described herein (e.g., dynamic pricing engine 106 of FIG. 1), in accordance with at least one embodiment. Flow 700 may begin at 702 where an offer request is transmitted. One or more offers may be received at 704 (e.g., from third-party providers of the items and/or from an offer engine). Individual offers include pricing information associated with the item. At 706, based at least in part on a determination that the offers are received during a time when offers are being accepted, a price may be determined for the item based at least in part on the received offers.

Figure 8:
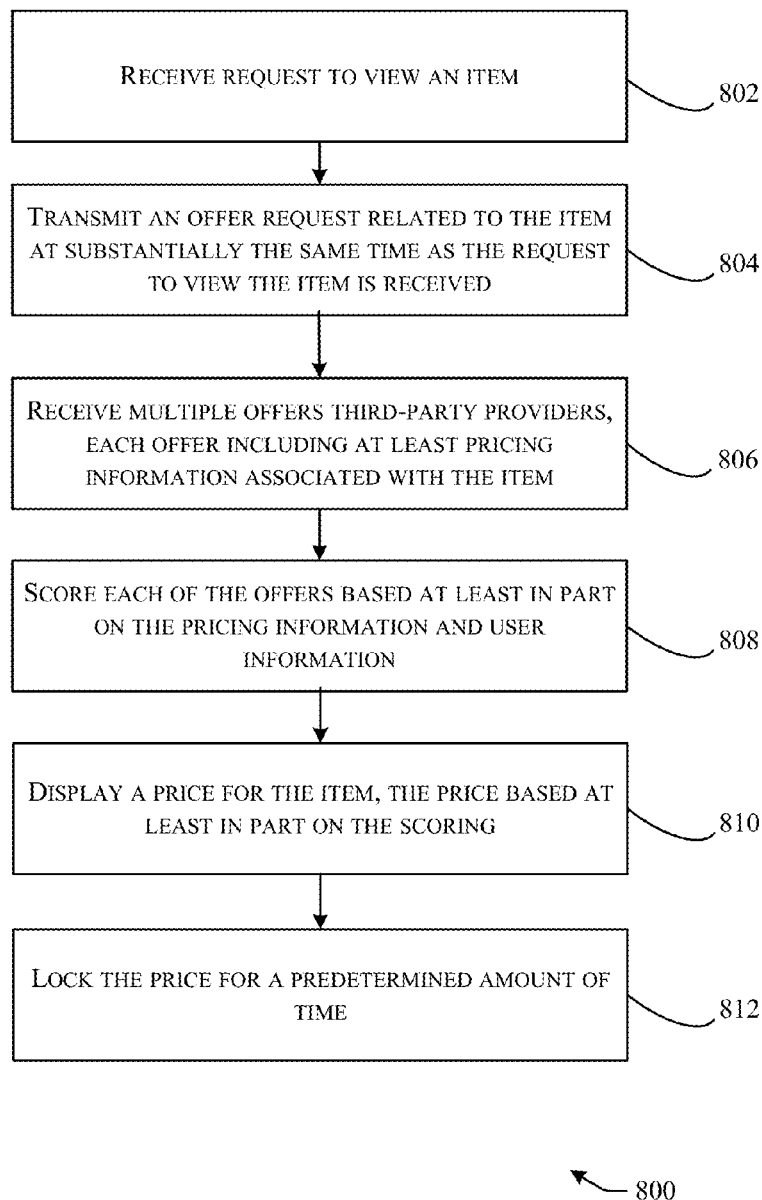
FIG. 8 is a flowchart illustrating a method for utilizing the dynamic pricing engine described herein, in accordance with at least one embodiment.

FIG. 8 is a flowchart illustrating a method 800 for utilizing the dynamic pricing engine described herein (e.g., dynamic pricing engine 106 of FIG. 1), in accordance with at least one embodiment. Flow 800 may begin at 802 where a request to view an item is received. The request to view an item may constitute a triggering event. At 804, an offer request for the item may be transmitted at substantially the same time as the request to view the item was received (e.g., within 5 milliseconds). The request for offers may be transmitted to one or more third-party providers (e.g., merchant computers 332). At 806, multiple offers may be received from third-party providers, each offer including at least pricing information associated with the item. At 808, each of the offers may be scored based at least in part on the pricing information and user information. A price may be displayed for the item at 810; the price may be based at least in part on the score. At 812, the price may be locked for a predetermined amount of time.

Figure 9:
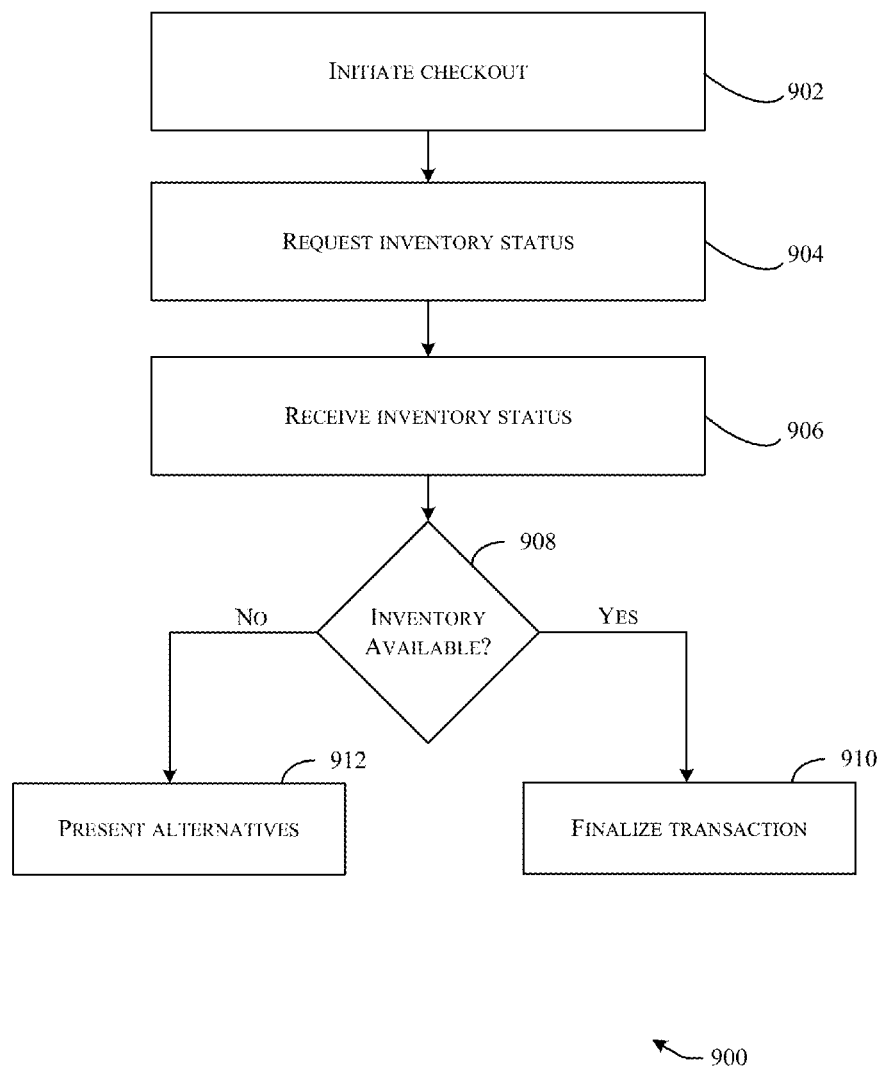
FIG. 9 is a flowchart illustrating a method for utilizing the dynamic pricing engine described herein, in accordance with at least one embodiment.

FIG. 9 is a flowchart illustrating a method 900 for utilizing the dynamic pricing engine described herein, in accordance with at least one embodiment. Flow 900 may begin at 902 where a checkout may be initiated. For example, the user, after electronically selecting an item to be placed in his shopping cart, may navigate to the shopping cart and select an option to "checkout." Alternatively, the user may select an option that both places the item in the shopping cart and initiates the checkout procedure. At 904, the dynamic pricing engine (e.g., dynamic pricing engine 106 of FIG. 1) may request inventory status from the merchant offering the selected item. The dynamic pricing engine may additionally request inventory status from one or many alternative merchants offering the item for consumption. At 906, the inventory status may be received from the merchant and/or the one or many alternative merchants. At 908, the dynamic pricing engine may determine whether the inventory is available from the merchant. If the inventory is available, the transaction may be finalized at 910. Finalization may include, but is not limited to, submission by the user of shipping and payment information. If the inventory is unavailable from the merchant, the dynamic pricing engine may present other offers submitted by the one or many alternative merchants at 912.

Figure 10:
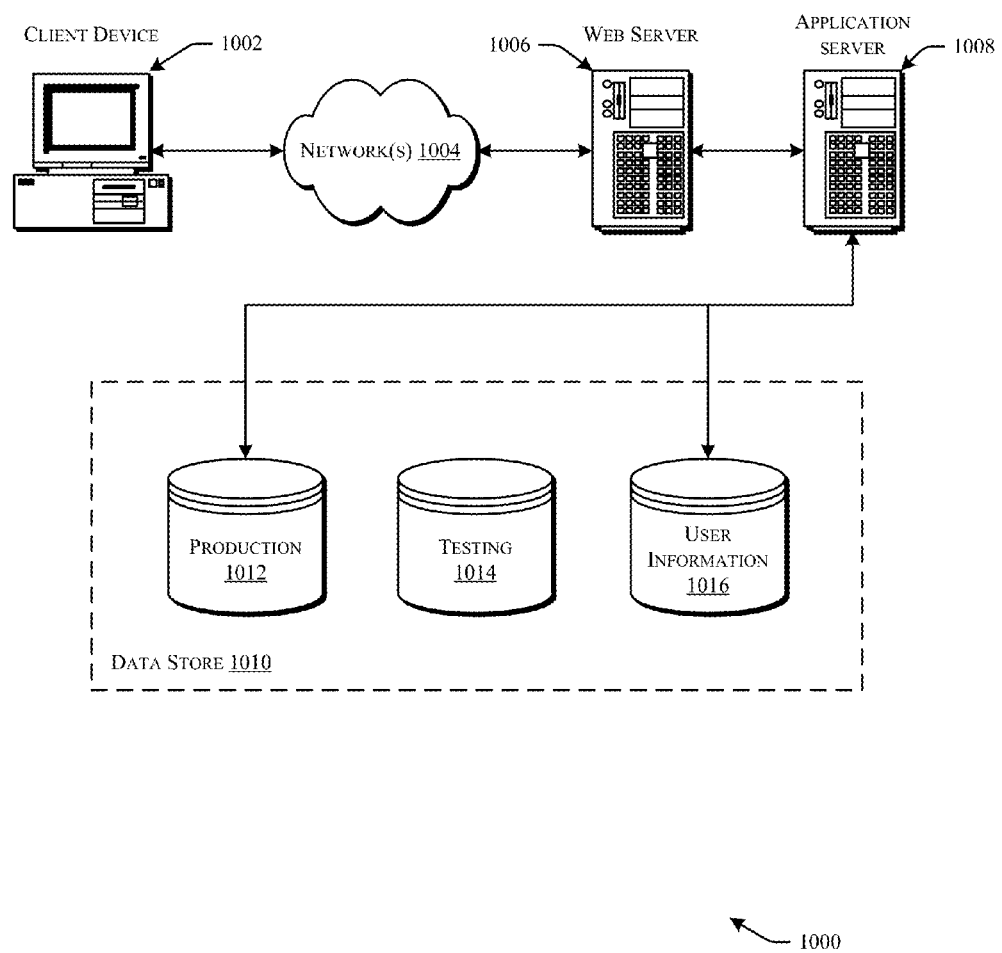
FIG. 10 illustrates an environment in which various embodiments can be implemented.

FIG. 10 illustrates an environment 1000 in which various embodiments can be implemented. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
  receiving, from an electronic device associated with a user, a request to view an item detail network page related to an item offered for consumption on an electronic marketplace;
  responsive to the request to view the item detail network page, transmitting an offer request related to the item to a plurality of computer systems individually associated with a plurality of third-party providers, the offer request being transmitted during a time period required to generate the item detail network page in response to the request, the offer request specifying that a response must be received within the time period;
  during the time period required to generate the item detail network page, receiving a plurality of offers from the plurality of third-party providers, individual offers of the plurality of offers including at least pricing information associated with the item;

during the time period required to generate the item detail network page, scoring, with one or more computers, the individual offers of the plurality of offers utilizing the pricing information and information associated with the user;

providing the generated item detail network page to display a price for the item corresponding to a optimally-scored offer of the plurality of offers; and locking the price for the item for a pre-determined amount of time, the locking being applicable to at least one of the user, a session, or a subset of users of the electronic marketplace, the locking of the price causing offers from third-party providers to be discarded during the pre-determined amount of time.

2. The computer-implemented method of claim 1, wherein the discarded offers remain unprocessed.

3. The computer-implemented method of claim 1, wherein individual offers include a cryptographic token indicating offer authenticity.

4. The computer-implemented method of claim 1, wherein the pre-determined amount of time is less than or equal to 500 milliseconds.

5. A computer-implemented method, comprising:

receiving, by a server device from an electronic device, a request to view a network page related to an item offered on an electronic marketplace;

transmitting, by a server device to one or more offer sources, an offer request related to the item available on the electronic marketplace;

prior to providing the network page to the electronic device, receiving, from the one or more offer sources, one or more of offers responsive to the offer request, individual offers including at least pricing information associated with the item, the one or more offers being received within a time period required to generate the network page in response to the request; and based at least in part on a determination that the plurality of offers are received during a time when offers are being accepted, determining, by the server device from the received one or more offers, an item price to be presented on the network page, the time during which offers are being accepted corresponding to a portion of a time period needed to generate the network page.

6. The computer-implemented method of claim 1, wherein the offer request comprises at least one of demographic information, past purchase history, or clickstream data associated with a customer.

7. The computer-implemented method of claim 1, wherein subsequent offer requests transmitted after the offer request comprise at least one of pricing information received from one or more third-party providers of the plurality of third-party providers as a result of a previously-transmitted offer request or a statistical summary of the pricing information received from the one or more third-party providers as a result of the previously-transmitted offer request.

8. The computer-implemented method of claim 1, wherein transmitting the offer request comprises transmitting, with the offer request, at least one of sale trend information, conversion rates, sales volume information, or item inventory of at least one other third-party provider of the item.

9. The computer-implemented method of claim 1, wherein the one or more offer sources include at least one of a third-party provider of the item, or an offer engine authorized to make offers on behalf of the third-party provider.

10. The computer-implemented method of claim 1, wherein transmitting the offer request, receiving the plurality of offers, and determining the price for the item individually occur multiple times in response to receiving a triggering event, and wherein transmitting the offer request, receiving the plurality of offers, and determining the price for the item the multiple times occurs prior to providing the network page to the electronic device.

11. The computer-implemented method of claim 1, further comprising:

storing the plurality of offers in a cache; and preventing changes to the cache for a pre-determined amount of time.

12. The computer-implemented method of claim 11, wherein the preventing changes to the cache occurs a period of time after the offer request is transmitted, and wherein the period of time is determined from historical rates of change in price for the item.

13. A system, comprising:

a processor; and a memory storing computer-executable instructions that, when executed by the processor, cause the system to, at least:

receive a request to view an item detail network page related to an item offered for consumption on an electronic marketplace;

responsive to the request to view the item detail network page, transmit, an offer request for the item to a plurality of computer systems individually associated with a plurality of third-party providers, the offer request being transmitted during a time period required to generate the item detail network page in response to the request, the offer request specifying that a response must be received within the time period;

during the time period required to generate the item detail network page, receive a plurality of offers from the plurality of third-party providers, individual offers of the plurality of offers including at least pricing information for the item;

during the time period required to generate the item detail network page, score, with one or more computers, the individual offers of the plurality of offers utilizing the pricing information and information associated with the user;

provide the generated item detail network page, the generated item detail network page comprising a price for the item corresponding to a optimally-scored offer of the plurality of offers; and locking the price for the item for an amount of time, the locking being applicable to at least one of the user, a session, or a subset of users of the electronic marketplace, the locking of the price causing offers from third-party providers to be discarded during the pre-determined amount of time.

14. The system of claim 13, wherein the amount of time is calculated from at least one of an amount of network traffic associated with the electronic marketplace, a conversion rate associated with the item, a rate of change of a price associated with the item, or a historical price fluctuation associated with the item.

15. The system of claim 13, wherein the offer request includes a user-defined pricing threshold.

16. The system of claim 15, further comprising:

receiving a request for the item including the user-defined pricing threshold; and notifying the user when the determined price falls below the user-defined pricing threshold.

17. The system of claim 13, wherein the plurality of offers include at least one secondary offer, the secondary offer including at least one of an add-on item offer, a discount offer, an up-sell offer, or a bundle offer.

18. The system of claim 17, wherein the individual offers of the plurality of offers are scored based on at least one of the pricing information, inclusion of the at least one secondary offer, and information associated with the user.

19. A non-transitory computer-readable storage medium having stored thereon computer-executable instructions that, when executed by a computer, cause the computer to perform operations comprising:
   receiving a request to view an item detail network page related to an item offered for consumption on an electronic marketplace;
   responsive to the request to view the item, transmitting an offer request related to the item to a plurality of computer systems individually associated with a plurality of third-party providers, the offer request being transmitted during a time period required to generate the item detail network page in response to the request, the offer request specifying that a response must be received within the time period;
   during the time period required to generate the item detail network page, receiving a plurality of offers from the plurality of third-party providers, individual offers of the plurality of offers including at least pricing information associated with the item;
   during the time period required to generate the item detail network page, scoring, with one or more computers, the individual offers of the plurality of offers utilizing the pricing information and information associated with the user;
   providing the generated item detail network page, the generated network page comprising the price for the item, the price corresponding to a optimally-scored offer of the plurality of offers;
   locking the price for the item for a pre-determined amount of time, the locking being applicable to at least one of the user, a session, or a subset of users of the electronic marketplace, the locking of the price causing subsequent offers from third-party providers to be discarded after the locking as occurred and before the pre-determined amount of time has elapsed.

20. The non-transitory computer-readable medium of claim 19, wherein the plurality of offers further comprise shipping information and the scoring is further based on the shipping information.

21. The non-transitory computer-readable medium of claim 19, wherein the scoring is further based on availability of the item from the third-party provider.

22. The non-transitory computer-readable medium of claim 19, wherein the pricing information includes multiple prices, an individual price being valid for a particular amount of time or for a particular number of obtained items.

23. The non-transitory computer-readable medium of claim 22, wherein the price is locked until a threshold number of total user views of the generated item detail network page since the price for the item was locked, or in response to determining that a number of scored offers have become invalid.

\* \* \* \* \*